Figure 1:
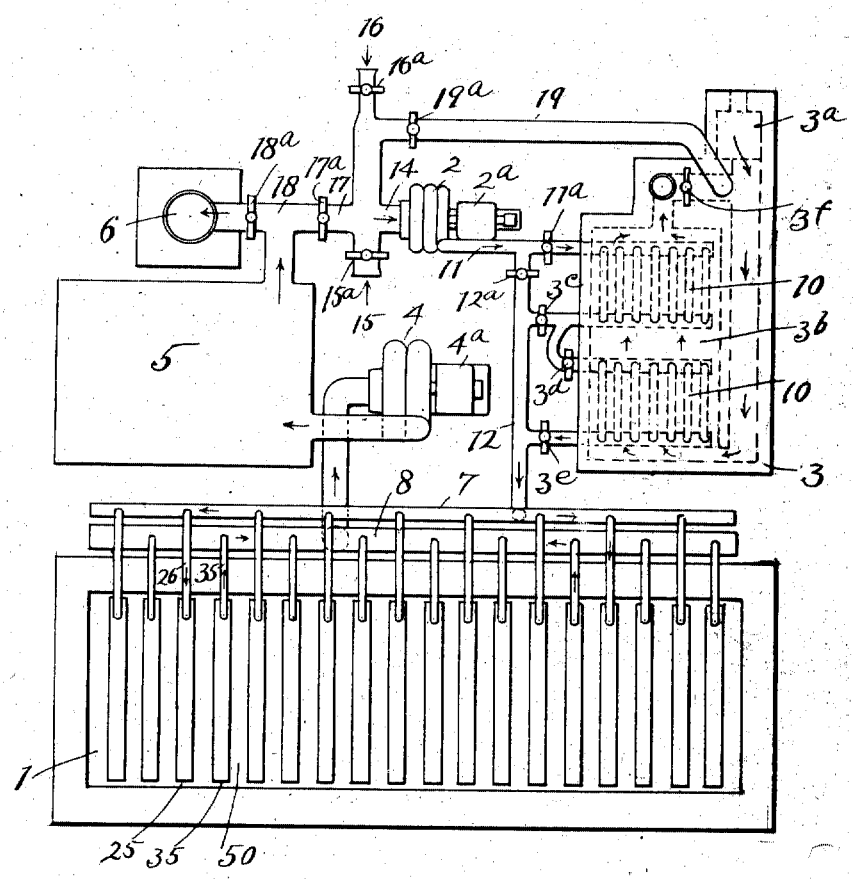

E. B. KIRBY.
APPARATUS FOR SUBJECTING SUBDIVIDED SOLID MATERIALS TO THE ACTION OF A CURRENT OF GASES.
APPLICATION FILED JULY 21, 1914.

1,281,585.

Patented Oct. 15, 1918.

UNITED STATES PATENT OFFICE.

EDMUND B. KIRBY, OF ST. LOUIS, MISSOURI.

APPARATUS FOR SUBJECTING SUBDIVIDED SOLID MATERIALS TO THE ACTION OF A CURRENT OF GASES.

1,281,585.     Specification of Letters Patent.     Patented Oct. 15, 1918.

Application filed July 21, 1914. Serial No. 852,203.

*To all whom it may concern:*

Be it known that I, EDMUND B. KIRBY, a citizen of the United States, residing at St. Louis, in the county of St. Louis and State of Missouri, have invented a certain new and useful Improvement in Apparatus for Subjecting Subdivided Solid Materials to the Action of a Current of Gases, of which the following is a full, clear, and exact description.

The object of this invention is to provide an apparatus by which to quickly and definitely establish, control, and regulate, at all stages of the operation, the temperature of the individual grains of a mass of material, such as crushed ore and the chemical composition of the gases in direct contact with said individual grains, to the end that desired results may be economically and quickly produced, regardless of the chemical composition of the material or its changes, in chemical composition as the roast progresses.

The broadly new capacity of the apparatus is that it provides for the prompt and definite control of the conditions to which the individual grains of the ore are subjected; whereas prior roasting apparatuses have been able to merely establish and maintain, in an indefinite and average way, conditions for the mass as a whole, and to give each grain turns at all of the varying conditions in different parts of the furnace, or at different stages of the roast; or, as is done in sinter roasting, by adjusting the ore mixture to certain fixed conditions and progressively subjecting the ore to those conditions.

In order to impart a clear understanding of the distinctions between this apparatus and the apparatuses heretofore used, a brief review of the prior art is deemed advisable.

In the ordinary ore roasting, as distinguished from sinter roasting, one much used class of apparatus is such that constantly and irregularly varying gases which are produced by the combustion of fuel, mingled irregularly with air admitted at various places, is made to sweep rapidly over the surface of the crushed ore, which constitutes a horizontal layer several inches thick upon the hearth of a suitable furnace receptacle. The poorly mixed current of gas produced escapes up the chimney, with only a portion of its heat, and only a portion of its chemical efficiency utilized, since there has neither been opportunity for effective contact with the grains nor time for the gases to react fully with them. Each grain beneath the surface is enveloped in a small volume of stagnant gases inclosed in the interstices of the material, and composed of chance proportions of the overhead current and various products of the decomposition of the material itself. Not only are there the widest differences in the uncontrolled gas mixtures which are in actual contact with the individual grains, but there are also great differences in the temperature of the grains themselves, due to the irregular conduction of heat from various parts of the furnace, irregularities of radiation of the flame from the furnace roof and sides upon the surface grains, heat differences in different parts of the furnace, etc. Moreover any changes in either the temperature or chemical composition of the overhead current reach the underlying grains of the mass very slowly and irregularly.

Attempts have been made by stirring, or by lifting and dropping, or moving the material in the furnace to give each grain a turn-about exposure to all these different conditions,—trying in an indefinite and approximate way to keep the worst of them within limits. Under such conditions, each grain, obviously, has a large percentage of lost time, including every period in its individual experience when it lay excluded from the roasting conditions it required at that stage, and was therefore not progressing. It also has to take its turn at all the injurious conditions presented.

In muffle roasting furnaces, where the gases of fuel combustion do not come in contact with the ore, but transmit their heat by conduction through the floor underneath the ore, and by radiation from the roof overhanging it, temperature changes are produced more slowly and with greater difficulty. The air supply admitted to the muffle has been more or less well regulated, but this only affects the conditions to which the mass as a whole is subjectetd, and does not control the conditions to which the individual grains are subjected; and therefore such furnaces are as inefficient as those first mentioned, and the difficulties before mentioned still prevail.

In apparatus for roasting without fuel, where the ore generates its own heat, the general mass conditions are fixed by the air admitted to different portions of the charge, but the operation is subject to the same difficulties above mentioned.

In sinter roasting a horizontal layer of ore mixture, which has been compounded to have the required chemical composition (if the native ore did not have that composition) is first ignited by direct contact with a flame or burning fuel, and a current of air is then drawn or blown through it to support the combustion. All of this layer will be progressively subject to substantially the same fixed unchangeable conditions, with any power of regulation. The action is like that of a fire running through a hay field or through a fuse which has been carefully composed or prepared for it.

With the old apparatuses, therefore, mass conditions only were controlled and these imperfectly at best; and no attempt, even, was made for definitely establishing and controlling and promptly varying conditions to which the individual grains were subjected. Ore roasting has not therefore been nearly as efficient or economical as it should be in any case. Moreover, many refinements of the roasting process known to be required, such as confining sulfatization within certain desired limits, avoiding the formation of certain insoluble ferrites or basic salts, etc., and the sintering of mixtures containing varying proportions of sulfur, etc., have been either too expensive to practise, or wholly impossible.

The apparatus herein shown and described is constructed upon the theory that to make roasting efficiency and refinements possible, there must be definite and prompt control and regulation, at all stages of the roast, of the temperature of each individual grain, and of the chemical composition and temperature of the gases in direct contact with it; and likewise that in most cases these conditions should be substantially uniform as to all of said individual grains, at the same time; but should be capable of quick and definite variations.

With this apparatus the desired control of the conditions to which the individual grains are subjected is attained and all of the other difficulties mentioned are remedied by causing a current of prepared gases to flow swiftly through the interstices of the whole mass, so as to reach all of its grains alike. This current is preheated to the precise temperature required at a distance and before it comes in contact with the ore, and no externally generated heat, save the flameless heat conveyed by this heated gas current is allowed to reach any portion of the ore.

Means are provided for making up, by measurement, and closely controlling and regulating the chemical composition of the gas mixture before it comes in contact with the ore. The components, which, in ore roasting, most commonly require regulation, are the free oxygen, and, in some cases, $SO_2$. This regulation of the free oxygen percentage in the current of gases governs the rate of oxidation, and therefore the generation of heat by the material itself. It not only regulates this additional self generated heat for the mass as a whole, but it also affords a perfect control over the temperatures of those individual grains of the mass, such as sulfids, etc. which are oxidizable, and therefore self heating. By restricting the percentage of free oxygen in the moving current which envelops the grains they may be prevented from heating themselves to an injurious degree above the regulated temperature of the mass. By increasing the percentage of free oxygen while maintaining the temperature of the current, oxidation may be, on the other hand, stimulated to such rapidity as to cause sintering or fusion when this is desired. Additionally the oxidation may be further intensified by raising the blast pressure so as to have the combustion take place in compressed air.

Figure 2:
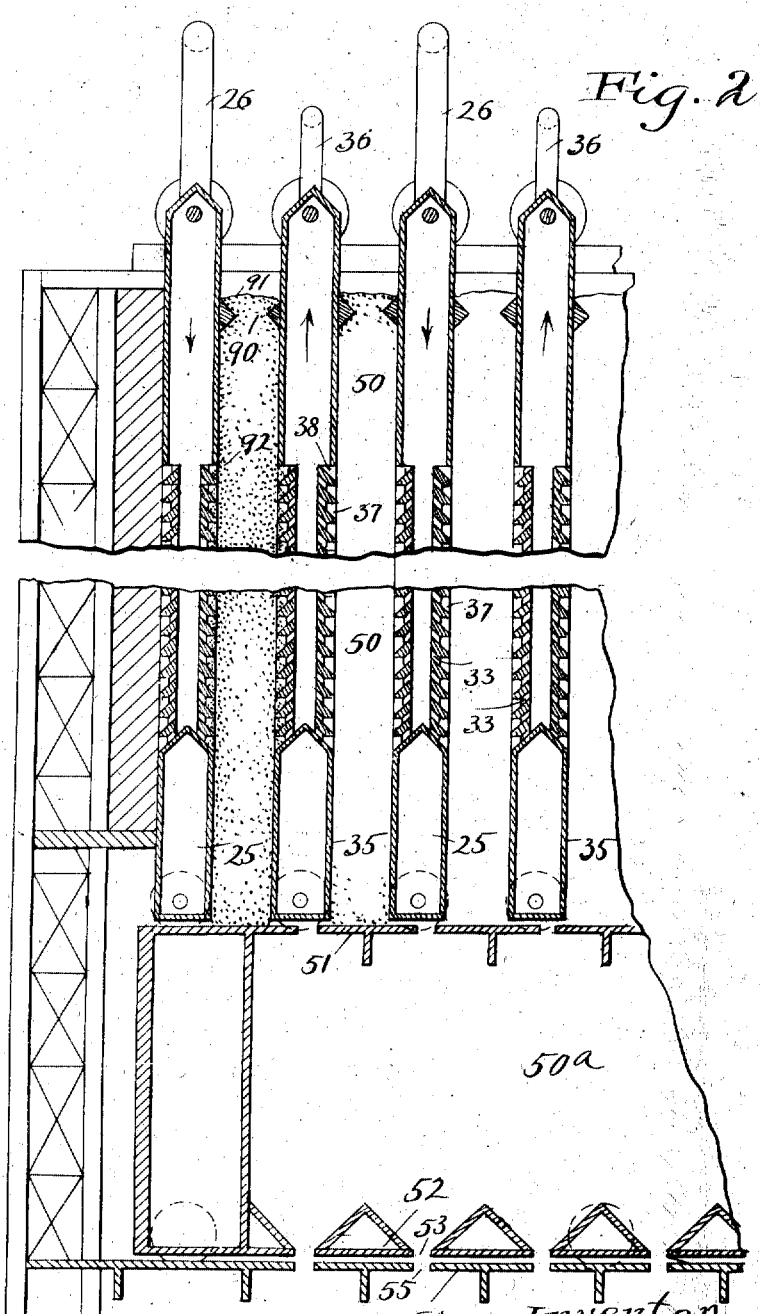
Figure 3:
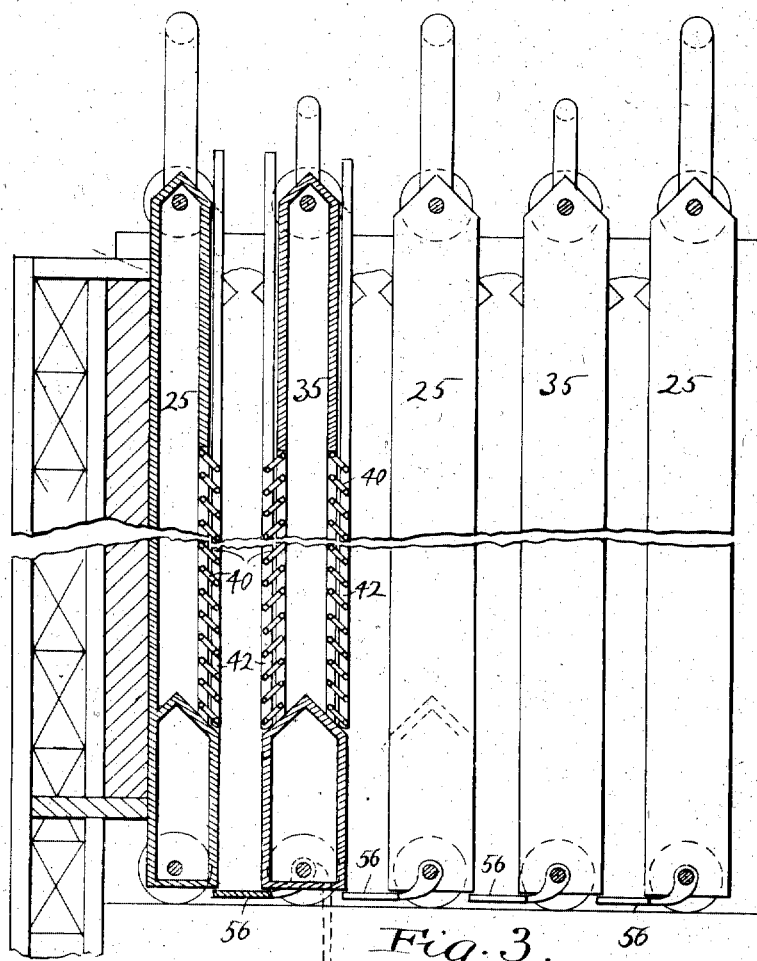
Figure 4:
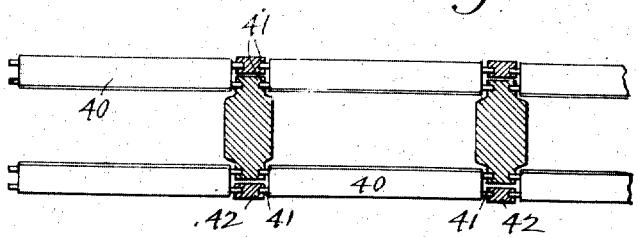
Figure 5:
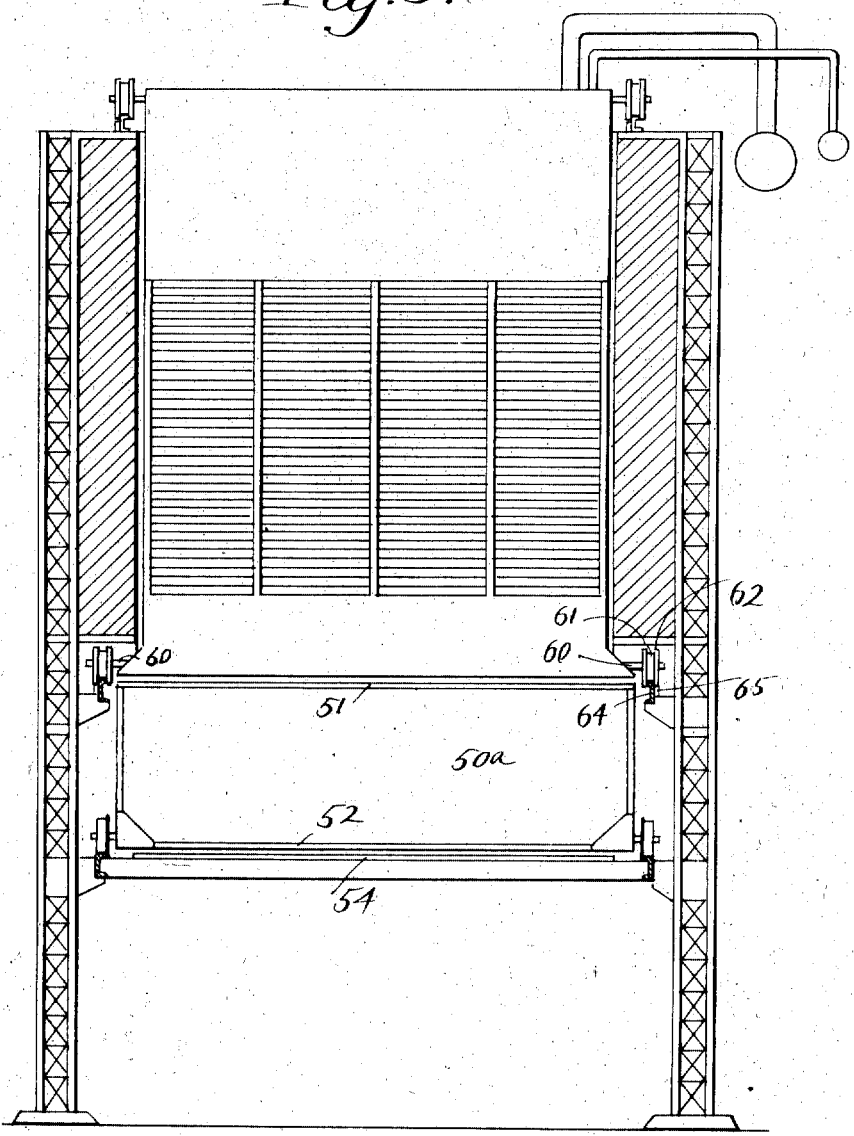
Figure 6:
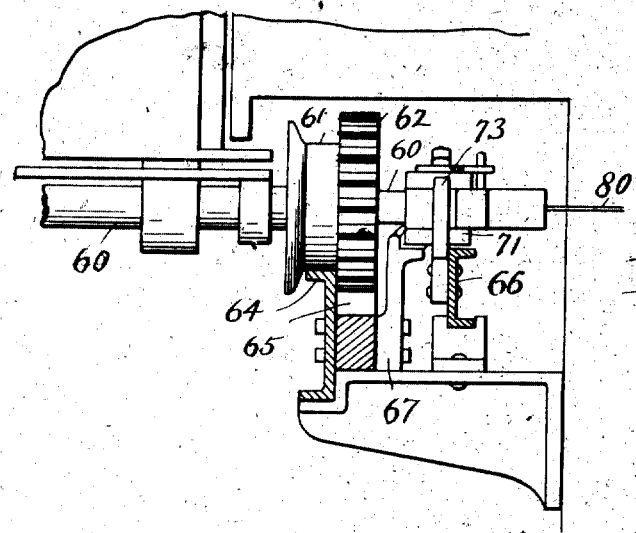
Figure 7:
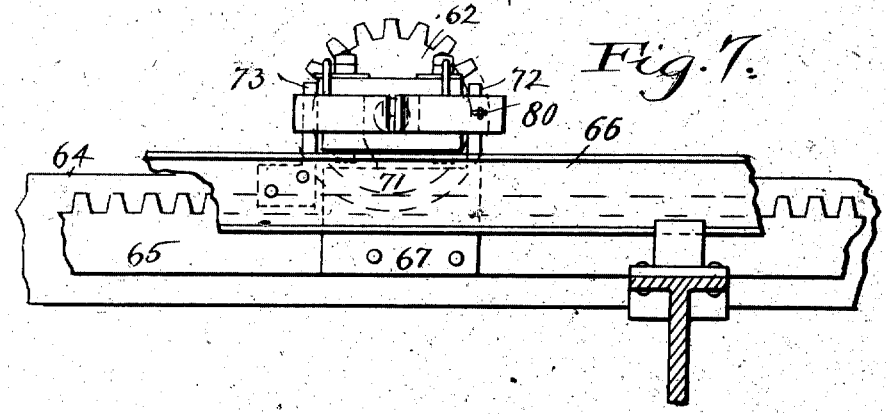
Figure 8:
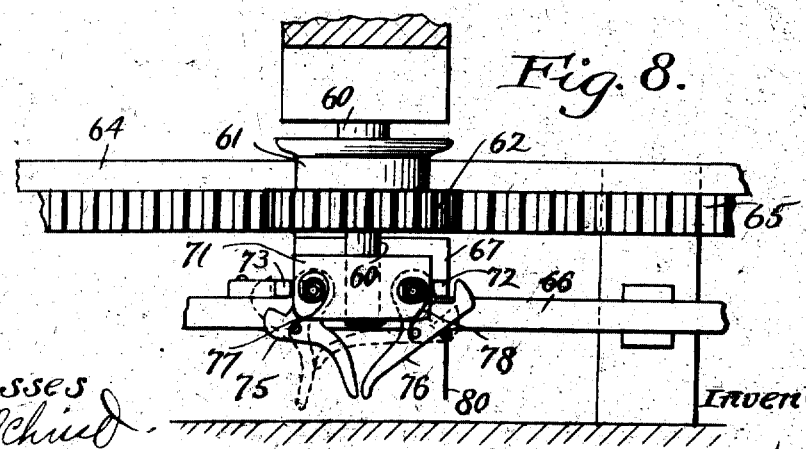
Figure 9:
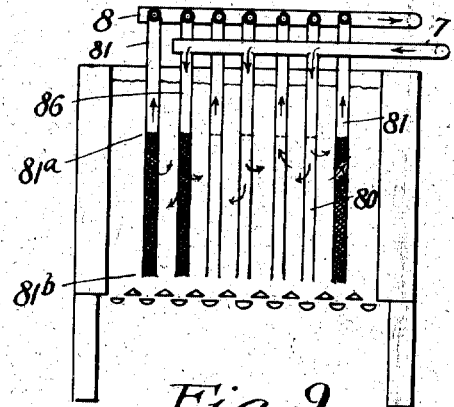
Figure 10:
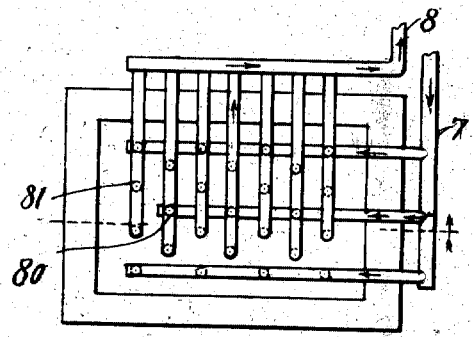

The apparatus by which these and other desirable results, suggested by the character of the ore and its condition, may be brought about, constitutes the present invention as hereinafter described and definitely pointed out in the claims, and is shown in the accompanying drawings, in which Figure 1 is a plan view of the apparatus in a good practical form. Fig. 2 is a longitudinal vertical section through one end of the furnace, showing the construction preferred for non-sinter roasting. Fig. 3 is a side elevation, partly sectioned, of a furnace in the form best adapted for sinter roasting. Fig. 4 is a sectional plan view of one of the partition conduits shown in Fig. 3. Fig. 5 is a transverse vertical sectional view through the furnace, when constructed as shown in Fig. 2. Fig. 6 is a transverse vertical sectional view of the mechanism at one side of the furnace through which power actuated devices may be caused to move the conduit partitions in said furnace. Fig. 7 is a side elevation of the same mechanism. Fig. 8 is a plan view of this same mechanism. Figs. 9 and 10 are respectively a vertical sectional view and a plan view of a furnace construction in which the incoming and outgoing gas conduits are differently constructed and arranged within the furnace.

Figure 11:
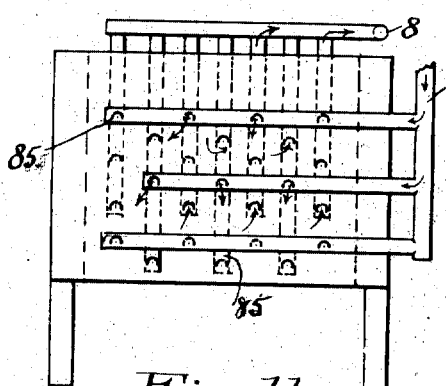
Figure 12:
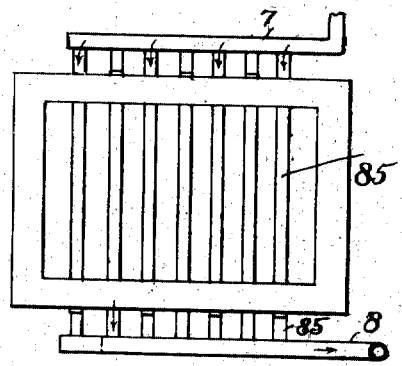
Figure 13:
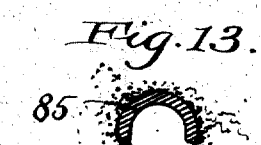
Figure 14:

Figs. 11 and 12 are respectively a vertical section and a plan view showing a different construction and arrangement of conduits in the furnace chamber. Fig. 13 is a vertical section of one of the conduits in Figs. 11 and 12; and Fig. 14 is a horizontal section of one of the conduits shown in Figs. 9 and 10.

The apparatus comprises a number of appliances operatively connected. It is shown in Fig. 1 in its most complete form, as adapted for use with all kinds of ores, and for the production of all possible desirable effects upon them, as there shown, it includes a furnace chamber 1, for holding the ore in such a way that the current or blast of prepared gases may be forced through interstices of said ore; a pressure fan or blower 2 for forcing the prepared gases into said receptacle, a hot blast stove 3 for preheating the prepared gases; a vacuum fan or blower 4 for withdrawing the gases from said receptacle; a separating device or chamber 5 for dust and fume in the outgoing current; motors $2^a$ and $4^a$ for the two fans, respectively; the incoming gas main 7; the outgoing gas main 8; the chimney 6 into which said outgoing main discharges; and suitable pipes, as hereinafter described.

All parts of the apparatus, except the furnace 1 and the component parts thereof to be explained, consists of standard or well known appliances, each of which is constructed in a great variety of designs. I do not limit myself to any particular form or design of any of these individual parts, selecting whatever suitable device is most readily attainable, at a satisfactory price. Moreover, for may ores all of the above mentioned appliances are not required. For example, it is self evident that with some ores either the pressure or the vacuum fan alone can be made to move the current. With many ores, the dust and fume separating device 5 would not be required.

The hot blast stove 3 shown is of the pipe class. That is to say, the stove includes a fuel combustion chamber $3^a$ connected with chimney 13, an oven $3^b$, and numerous pipe coils 10 in the oven. These are connected in series with the gas supply pipe 11, which leads away from the blast fan 2, and with the incoming gas main 7. The various coils are also connected with the by-pass pipe 12, which connects the pipe 11 with the gas main 7. In the coils and by-pass pipe 12 are valves $11^a$, $12^a$, $3^c$, $3^d$, $3^e$, by the manipulation of which the blast current may be by-passed as desired from part or all of the pipe coils. As a further means of regulation the heating of the oven $3^b$ may be governed by the short circuiting damper $3^f$ between the fireplace $3^a$ and the chimney 13.

The inlet pipe 14 of the blast fan 2 is connected with several other pipes through which it draws the gases for producing the particular gas mixture required. The pipe 15 is that through which air may be drawn; and it contains a gaged valve $15^a$ by which to regulate the size of the orifice through which the air must flow, and thereby to regulate the rate of such flow. 16 represents a pipe which may be connected with a supply apparatus of any kind of gas which may be required in the gas mixture; and $16^a$ is the gaged regulating valve for said pipe. 17 represents a pipe which connects pipe 14 with pipe 18 through which the hot exhaust gases from the furnace 1 are discharged into chimney 6; and the gaged valves $17^a$ and $18^a$ provide the means for accurately regulating the rate at which said exhaust gases may be sucked into pipe 14. 19 represents a pipe for connecting the inlet pipe 14 with the combustion chamber $3^a$ of the hot blast stove; and it contains a gaged regulating valve $19^a$.

As many of these gas supply pipes with gaged regulating valves may be provided as may be required, and they may be connected with suitable sources of the desired gases. With the construction shown, however, provision is made for preparing, as required for use, a gas mixture made up of measured and therefore properly proportioned parts of air, and any other needed gas, the hot gaseous products of fuel combustion in the stove, containing $CO_2$, and the hot exhaust gases discharged from the ore roasting furnace 1; and, for most, if not all, ore roasting operations, these used singly or in any combination desired, will suffice.

The furnace chamber 1 is preferably a rectangular chamber without a top. In it are two series of gas conduits, which, when the furnace is filled with ore, will be buried in the mass of ore. One group of these conduits will be connected with the inlet main 7 and will be hereinafter referred to as incoming gas conduits; while the other group of conduits will be connected with the exhaust main 8, and will be hereinafter referred to as the outgoing gas conduits. The conduits of one group must be arranged in such juxtaposition to those of the other group that the incoming gas passing through suitable properly distributed gas passages in the incoming gas conduits will flow through the interstices of the surrounding mass of ore in the chamber, and thence into gas passages in the outgoing gas conduits. Various constructions of gas conduits may be employed, and the openings or passages for the discharge and the reception of gas may be of various forms. Several forms of gas conduits are shown in the drawing, and will be hereinafter described.

The preferred construction, however, is shown in two specific forms in Figs. 1, 2, 3, 4 and 5. Each of the conduits 25, 35 is a substantially vertical hollow leaf or partition, extending across the furnace from side to side and from the bottom to the top thereof. There may be any required number of these partition-conduits which are arranged in parallel relation and rather close together, so that they divide the space within the chamber into numerous ore cells, and divide the ore mass into a number of substantially vertical sheet-like layers 50 which respectively fill said cells. The thickness of each vertical ore sheet,—that is to say, the distance between adjacent partition-conduits must be such that the current of gas can flow across this space through the interstices of said ore sheet. Alternate partitions 25 are for the incoming blast; and the intermediate partitions 35 are for the outgoing blast. The partitions are preferably adjustable lengthwise of the furnace to accommodate any changes which may be made in the permeability of the crushed ore, etc.; and they may be hung or supported within the furnace in any convenient way. When, however, the conditions are settled,—that is to say, where an apparatus is provided for use continually with one kind of ore only, these partitions may be built as fixed walls dividing the furnace chamber into separate ore cells. These partitions are, of course, hollow, or, at least, their operative parts are, and they are connected by suitable pipes 26, 36, with their gas mains 7 and 8 respectively.

These partition-conduits may be made of any material which is best adapted to the nature of the gas employed and the temperatures to which they are subjected. For ordinary roasting temperatures and conditions iron will be found satisfactory; but for higher temperatures refractory materials should be used. Gas passages 33 are made through the opposed walls of these conduit-partitions; and they may be of any suitable form and admit of a great variety of design, depending upon the material used in making the partitions, the character of the ore material to be treated, and whether this material will remain non-adherent, or whether it will agglomerate under treatment. It is desirable to expose as high a percentage as possible of the faces of the ore sheet to the free entry and exit of the gas current. At the same time the crushed ore should be prevented from freely entering the partition conduits through those gas passages or from adhering to and choking said gas passages.

The upper and lower parts of these partition walls are imperforate, and for a considerable distance from their lower ends. In charging the furnace, inert material, such as roasted ore is packed between the imperforate lower part of these partition conduits in sufficient quantity to serve as a seal preventing the downward escape of the gas. Next above this ore and between the perforated walls of the partitions will be packed the unroasted ore which is to be treated. Above this and between the imperforate upper parts of the partitions will be unroasted ore sufficient in quantity to act as a seal to prevent the escape upward of the gas.

In order that this upper seal may not be lifted bodily by the pressure of the gas beneath, it must either be made thick and heavy enough to withstand this pressure, or be retained by any convenient means which will prevent its upward movement bodily. One of the various possible means for thus retaining the top seal is shown in Fig. 2 where the space for the material is constricted at the point 90 just beneath the surface 91 of the top sealing layer 91—92. This constricted opening permits the charged material to fall through it piecemeal but does not permit any upward movement of the mass.

The construction shown in Fig. 2 is particularly suitable for non-sinter roasting. Each wall of each partition is made with a series of miniature eaves 37 located one above another; and openings beneath these eaves go through the partition walls. The grains of the ore mass roll under each eave at the angle of repose of the material, leaving a space 38 under each eave open for the passage and distribution of gases. This furnishes an open contact between the gas current and the ore mass longitudinally under each eave. The angle at which the of each eave slopes outwardly toward the ore is such as to discharge the ore resting upon it.

The construction shown in Figs. 3 and 4 is more particularly adapted for sinter roasting,—that is for use in connection with ores which agglomerate under treatment. In this construction the sides of the operative parts of the partitions are made of a series of rocking slats 40 which form inclined eaves,—each slat having four rocking pins 41, one at each corner. The two inner pins of each slat, one at each extremity, are mounted in bearings in the framework of the partition conduit. The other two pins at the outer edges of each slat are mounted in the vertically movable rocking bars 42. After each ore roasting operation these bars may be moved up and down, and the slats will thereby be rocked and clear themselves of the adhering ore particles.

During the roasting operation the ore sheets in the several ore cells between partitions are upheld by suitable gates at the lower ends of said ore cells. In the construction shown in Fig. 2 these gates are formed of flat bars 51 which are secured across the top of a movable ore receiving box 50ª. The bottom of this bin is formed of transverse flat bars 52 separated so as to leave slots 53 between them. The floor 54 over which this box rests is likewise formed with transversely extended slots 55. These slots and bars are so arranged relatively to each other that when the upper bars 51 are in position to close the lower ends of the ore cells, the lower bars 52 are in position to uncover the slots 55 in the floor 54 below the box. Therefore, while the roasting of the ore sheets in the ore cells is going on, the previously roasted ore which had been discharged into the bin will slowly flow out of the bin between the bars 52 which form its bottom and through the slots 55 in the floor. When this box is moved so as to uncover the lower ends of the ore cells it will close the slots in its bottom so that the ore discharged from the ore cells will for the time being be held in this box. It is therefore possible to utilize this box as a measuring box, by making of such size that it will hold just the amount of ore which it is desired to discharge from the ore cells. All of the ore in the ore cells should not, of course, be discharged because there should remain in the bottom of each cell a sufficient quantity of roasted ore to serve, as above stated, as a seal to prevent the downward escape of the gas.

In some roasting operations it is necessary to turn out the roasted product in a sintered or agglomerated condition, and the discharge of the solid cake thus formed requires some special facilities. The construction shown in Figs. 3, and 4 is believed to be best adapted for sinter roasting. In this construction the lower ends of the ore cells are closed by gates 56 hinged to the lower ends of the partitions. When these gates are allowed to swing down, they give a full opening,—that is an opening quite as wide as the distance between adjacent partitions. The gates may be closed and held closed in various ways, such as by means of chains attached to them and going up to the top of the furnace; and any suitable chain holding devices, not shown, may be provided. It is probably necessary also that the partitions in a furnace used for sinter roasting be capable of movement apart far enough to release and discharge the cake. Figs. 5, 6, 7 and 8 show means suitable for supporting these partitions in a manner which renders them easily movable, and also shows suitable mechanism capable of being power actuated for so moving them. In this construction each leaf or partition is supported at its lower end by an axle 60, the ends of which extend well under the walls of the furnace, where rails 64 are provided for the wheels 61, which are fixed to these axles. Each wheel has attached to its side a coarse gear wheel 62 which meshes with a toothed rack 65 alongside the rail. The forward motion of one wheel to a fixed point on its track is therefore accompanied by a corresponding movement of the opposite wheel.

The top of the leaf or partition is provided with a similar axle having wheels and gears which run upon rails and racks at the top of the chamber walls. This upper construction is mainly to maintain the leaf or partition in upright position, and not necessarily to carry its weight. When it is desired to use power for the movement of partitions this is applied near one end of each lower axle by the following special mechanism,— that is to say, on one side of the furnace is a longitudinally extended power rod in the form of a channel bar 66, which rod may project beyond the furnace in a position to be moved by any suitable mechanism. Coupling and holding mechanism is provided for each partition. It includes a frame 67 which is bolted to the rack 65 at the desired position. A movable coupling block 71 is bored to receive the prolongation of the axle 60. The block 71 is supported by and slides along the frame 67, and when in normal position rests with one end against an upstanding stop 72 fast to the frame. At the other end of the block ready to couple with it, stands a stud 73 which projects up from the power rod 66, which is shown in Fig. 8 at one limit of its stroke, with its stud 73 holding the block against stop 72. The block 71 carries two spring pawls 75, 76, for engaging the stud 73 and the stop 72 respectively. The spring 77 of pawl 75 tends to hold it free from the stud 73, while the spring 78 of pawl 76 tends to engage it with stop 72. The pawls are so shaped as to engage each other like a cam and tappet, wherefore a pull on the operating cord 80 which is connected with pawl 76 will move both pawls, thereby coupling the block 71 to the power stud 73 and releasing it from the stop 72. After this has been accomplished, the power rod 66 is moved to the left, as shown in Fig. 8, and thereby the partition is moved in the direction such as to widen the ore cell between one of its faces and the adjacent partition. When the power rod 66 is moved in the opposite direction the stud 73 by engaging block 71 will move the partition back to its normal position; and the pawl 76 being freed from the pull of cord 80 will engage the stop 72 to hold the partition in that position during the next roasting operation.

It will be understood that the described coupling and holding devices, or some other form of such devices, may be provided at one upper and one lower corner of each partition; but no attempt has been made to show such devices in detail when so erected.

The construction in Figs. 3, 4, 6, 7 and 8, and heretofore described in detail, is well adapted for use in performing any kind of roasting operations on any kind of ore. But it is unnecessarily complex for non-sintering roasting. The simpler construction shown in Figs. 2 and 5 and before explained is equally well adapted for non-sinter roasting, and additionally it contains means better adapted for controlling the discharge from the furnace of the roasted ore, when said ore is not in an agglomerated condition.

In Figs. 9 to 14 are shown other specific various modifications in the construction and arrangement of the conduits in the furnace.

As shown in Figs. 9 and 10, the inlet and outlet conduits are vertical pipes 80, 81, which are buried in the ore so close together that the gas blast discharged from the inlet conduits will readily flow through the interstices of the ore in substantial contact with all of the individual grains thereof, and will enter the exhaust conduits. Each conduit, in its perforated portion, as shown from 81$^a$ to 81$^b$, may be so constructed as to include a foraminous outer cylinder 82 whose holes are sufficiently small to exclude the ore grains which should be excluded, and this cylinder is secured around a spider like core 83, as shown in Fig. 14.

In Figs. 11 and 12 is shown a construction in which the conduits are in the form of horizontal inverted troughs 85 which when buried in the ore constitute horizontal conduits arranged in such relation to each other that the gas discharged into the ore mass from beneath the edges of the incoming conduits will flow through the interstices of said mass in intimate contact with the individual grains thereof, and will flow out beneath the edges of the outgoing conduits.

It will, of course, be understood that in both of the constructions last referred to, all of the incoming conduits are suitably connected with the incoming main, and all of the exhaust conduits are suitably connected with the outgoing main.

It is not to be understood that the several different forms of the invention shown exhaust the possibilities of varying the form without avoiding the essence of the invention. The exhibition of these different forms is merely to make clear the fact that the generic invention is not limited to any specific construction.

In using the described apparatus, it is evident that a current of prepared and preheated gases is caused to flow swiftly through the interstices of the ore mass in direct contact with the individual grains, so that all of said grains are, at the same time, subjected to substantially the same conditions. Obviously this decreases the time required for effecting the required chemical changes in the mass, in addition to securing the uniformity in such changes. The gas is preheated to the temperature required at any time, at a distance, and before it comes in contact with the ore; and care is taken that no externally generated heat, save the flameless heat conveyed by the current is allowed to reach any portion of the ore.

The definite composition of the gas current and the definite temperature to which it is preheated are under perfect control independently of each other, and are regulated by being immediately varied as required during the progress of the roasting operation. Any adjustment of temperature made by the stove by-pass valves or of composition made by the gas supply valves is felt within a few seconds and with substantial uniformity, by every individual grain of the charge.

Both the temperature of the current and the percentages of its active components are regulated to the definite points required within whatever limits of accuracy may be necessary. The temperature regulation is guided by suitable pyrometers placed in the gas current and also in the charge of material. The regulation of composition is guided by any suitable devices of the class known in the arts for indicating or determining either continually or at intervals the percentage of any gaseous component to be governed.

The exhaust gases which have passed through the charge may be recirculated through it in any proportion which is found desirable by drawing the desired percentage from the outgoing pipe 18 through the regulating valve 17$^a$. This recirculation may be desired to utilize the heat or the unexhausted chemical efficiency of these exhaust gases or to reduce the percentage of free oxygen in the mixture or for any other reason.

By restricting the percentage of free oxygen in the moving gas current which envelops the grains, they may be prevented from heating themselves to an injurious degree above the regulated temperature of the mass. By increasing the percentage of free oxygen while maintaining temperature of the current, oxidation may be, on the other hand, stimulated with such rapidity as to cause sintering or fusion, when this is desired. The oxidation may be further intensified by also raising the blast pressure, so as to have combustion take place in compressed air.

So also the hot products of combustion of fuel in the stove may be included in the gas mixture to any desired extent. This also helps to heat the gas mixture and to dilute its percentage of free oxygen.

Having described my invention, I claim:

1. In an apparatus for subjecting subdivided solid materials to the action of a current of gases, the combination of a receptacle for holding the material, an incoming partition-conduit within said receptacle having gas discharging apertures buried in the material, an outgoing partition-conduit within said receptacle having gas receiving apertures buried in the material,—said conduits being parallel, substantially upright, and in such juxtaposition to one another that the material between them will constitute a sheet of substantially uniform thickness permitting an adequate flow of gases from one conduit to the other through its interstices.

2. In an apparatus for subjecting subdivided solid materials to the action of a current of gases, the combination of a chamber for holding the material, a plurality of incoming gas conduits having gas discharging apertures buried in the material within said chamber, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material.

3. In an apparatus for subjecting subdivided solid material to the action of a current of gases, the combination of a chamber for holding the material, a series of upright transversely extended partition-conduits arranged in parallel relation within said chamber and dividing the material therein into a plurality of thin sheets which permit an adequate flow of gases from one conduit to another through the interstices of said material,—said conduits being divided into incoming and outgoing conduits which alternate with each other, the opposed faces of said partition-conduits having gas apertures which are buried in the material within said chamber.

4. In an apparatus for subjecting subdivided solid materials to the action of a current of gases, the combination of a receptacle for holding the material, a plurality of incoming gas conduits having gas discharging apertures buried in the material, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material, suitable charging openings above and suitable discharge openings below the space within the receptacle occupied by said material whereby the dry raw material may fall into its position by gravity and the dry finished products may discharge by gravity without tilting or overturning the receptacle, the upper end of said receptacle adjacent the charging opening being of smaller area than the remainder of said receptacle,—all of said buried apertures being at sufficient distances from the surface and any other exposures of the material to have adequate gas sealing masses of material interposed, and means to prevent the gas pressure in the receptacle from bodily lifting out the gas sealing masses of material.

5. In an apparatus for subjecting subdivided solid materials to the action of a current of gases, the combination of a receptacle for holding the material, a plurality of incoming gas conduits having gas discharging apertures buried in the material, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material, suitable charging openings above and suitable discharge openings below the space within the receptacle occupied by said material whereby the dry raw material may fall into its position by gravity and the dry finished product may discharge by gravity without tilting or overturning the receptacle,—all of said buried apertures being at sufficient distances from the surface and any other exposures of the material to have adequate gas sealing masses of material interposed, and the upper end of said receptacle adjacent said charging opening being inclined whereby the dry subdivided material can not be lifted out bodily by gas pressure beneath.

6. In an apparatus for subjecting subdivided solid material to the action of a current of gases, the combination of a chamber for holding the material, a plurality of incoming gas conduits having gas discharging apertures buried in the material, a plurality of outgoing conduits having gas receiving apertures buried in the material,—the apertures and the arrangement and juxtaposition of the conduits being such that there will be an adequate flow of gases from the incoming to the outgoing conduits through the interstices of the intervening material, suitable charging openings above the space within the chamber occupied by said material whereby the dry raw material may fall into position by gravity,—all of said buried apertures being at sufficient distances from the surface and any other exposures of the material to have adequate gas sealing masses of the material interposed, and a suction fan for drawing the used gas into, through, and out of said outgoing conduits.

7. In an apparatus for subjecting subdivided solid material to the action of a current of gases, the combination of a chamber for holding the material, a plurality of incoming gas conduits having gas discharging apertures buried in the material, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material, means for causing such a difference in pressure in the incoming and outgoing conduits as will cause a current of gas to flow as aforesaid, a gas main connected with the incoming conduits, a plurality of gas supply pipes connected with said main, and means for definitely proportioning and regulating to the degree of accuracy required the rates of delivery of gases from said gas supply pipes to said gas main.

8. In an apparatus for subjecting subdivided solid material to the action of a current of gases, the combination of a receptacle for holding the material, an incoming gas conduit having gas discharging apertures buried in the material, an outgoing gas conduit having gas receiving apertures buried in the material,—the apertures and the arrangement and juxtaposition of conduits being such that there will be an adequate flow of gases from one conduit to the other through the interstices of the intervening material, means for causing such a difference in pressure in the incoming and outgoing conduits as will cause a current of gas to flow as aforesaid, a gas main connected with the incoming conduits, a plurality of gas supply pipes connected with said main, and means for definitely proportioning and regulating to the degree of accuracy required the rates of delivery of gases from said gas supply pipes to said gas main.

9. In an apparatus for subjecting subdivided solid materials to the action of a current of gases, the combination of a chamber for holding the material, a plurality of incoming gas conduits having gas discharging apertures buried in the material, a plurality of outgoing gas conduits having gas receiving apertures buried in the material,—the apertures and arrangement and juxtaposition of the conduits being such that there will be an adequate flow of gases from the incoming to the outgoing conduits through the interstices of the intervening material, means for causing such a difference in pressure in the incoming and outgoing conduits as will cause a current of gases to flow as aforesaid, means for delivering gas into the incoming gas conduits, and means for so preheating the incoming gas current to the required temperature before it comes in contact with said material.

10. In an apparatus for subjecting subdivided solid materials to the action of a current of gases, the combination of a receptacle for holding the materials, an incoming gas conduit having gas discharging apertures buried in the material, an outgoing gas conduit having gas receiving apertures buried in the material,—the apertures and arrangement and juxtaposition of the conduits being such that there will be an adequate flow of gases from one conduit to the other through the interstices of the intervening material, means for causing such a difference in pressure in the incoming and outgoing conduits as will cause a current of gases to flow as aforesaid, means for delivering gas into the incoming gas conduits, means for so preheating the incoming gas current to the required temperature before it comes in contact with said material that the material need not be exposed to any externally generated heat save that conveyed by the current, and means for controlling and definitely regulating said preheating of the gas to the degree of accuracy required.

11. In an apparatus for subjecting the subdivided solid material to the current of gases, the combination of an ore holding chamber having a charging opening above and a discharge opening below, means to cause a flow of gas through the material in said chamber, and a movable measuring box located immediately beneath the discharge opening, the top of the box having an opening which registers with the discharge end of said discharge opening to admit material to the box when this stands at one extreme of its travel and said box having discharge openings in its bottom, and a fixed floor beneath the box adapted to close the openings in the bottom of the box when the box is at one extreme of its travel, and having openings which register with the openings in the bottom of the box when the latter is at the latter extreme of its travel.

12. In an apparatus for subjecting subdivided solid material to the action of a current of gases, the combination of a chamber for holding the material, a series of upright transversely extended partition-conduits arranged in parallel relation within said chamber and dividing the material therein into a plurality of thin sheets which permit an adequate flow of gases from one conduit to another through the interstices of said material,—said conduits being divided into incoming and outgoing conduits which alternate with each other, the opposed faces of said partition-conduits having gas apertures which are buried in the material within said chamber.—said apertures being constructed as a series of horizontal eaves, one above another, each eave having on its upper side a self-discharging slope and underneath it a space into which the material cannot run, said space being in open communication with the interior of the conduit.

13. In an apparatus for subjecting subdivided solid material to the action of a current of gases, the combination of a chamber for holding the material, a series of upright transversely extended partition-conduits arranged in parallel relation within said chamber and dividing the material therein into a plurality of thin sheets which permit an adequate flow of gases from one conduit to another through the interstices of said material,—said conduits being divided into incoming and outgoing conduits which alternate with each other, the opposed faces of said partition-conduits having gas apertures which are buried in the material within said chamber,—said gas apertures being in the form of a series of eaves formed by rocking slats which are pivoted to the sides of said partition-conduits, and means for simultaneously rocking said slats in convenient groups.

14. In an apparatus for subjecting subdivided solid materials to the action of a current of gases, the combination of a chamber for holding the material, a plurality of incoming gas conduits having gas discharging apertures buried in the material within said chamber, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material, means for causing such a difference of pressure in the incoming and outgoing conduits as will cause a current of gases to flow as aforesaid,—an incoming gas main connected with the incoming gas conduit, a plurality of gas supply pipes connected with said main,—and an outgoing gas main connected with the outgoing gas conduits,—one of the said supply pipes being so connected with the outgoing gas main as to be supplied with outgoing gases.

15. In an apparatus for subjecting subdivided solid materials to the action of a current of gases, the combination of a chamber for holding the material, a plurality of incoming gas conduits having gas discharging apertures buried in the material within said chamber, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material, means for causing such a difference of pressure in the incoming and outgoing conduits as will cause a current of gases to flow as aforesaid,—an incoming gas main connected with the incoming conduits, a plurality of gas supply pipes which are connected with said main, and a fuel combustion chamber with which one of said supply pipes is connected.

16. In an apparatus for subjecting subdivided solid materials to the action of a current of gases, the combination of a chamber for holding the material, a plurality of incoming gas conduits having gas discharging apertures buried in the material within said chamber, a plurality of outgoing gas conduits having gas receiving apertures buried in the material,—the apertures and the arrangement and juxtaposition of the conduits being such that there will be an adequate flow of gases from the incoming to the outgoing conduits through the interstices of the intervening material, means for causing such a difference of pressure in the incoming and outgoing conduits as will cause a current of gases to flow as aforesaid, an incoming gas main connected with said incoming conduit, a heating apparatus for preheating the gas before it is delivered into said gas main, and means for by-passing any desired fraction of gas around said heating apparatus.

17. In an apparatus for subjecting subdivided solid materials to the action of a current of gases, the combination of a chamber for holding the material, a series of upright incoming partition-conduits, a series of upright outgoing partition-conduits which are arranged alternately with the incoming partition-conduits, and in parallel close relation thereto whereby the space within said chamber is divided into a plurality of narrow ore cells,—the opposed faces of said conduits having gas apertures which are located in a zone whose upper level is a substantial distance below the top of the chamber and whose lower level is a substantial distance above the bottom of the chamber, means for admitting gas into the incoming partition-conduits, means for discharging gas from the outgoing partition-conduits, means for creating such difference in pressure that in the incoming partition-conduits as compared with the outgoing partition-conduits that gas will flow from the apertures in the former through the interstices of the material in said ore cells and into the outgoing partition-conduits through the apertures therein.

In testimony whereof, I hereunto affix my signature in the presence of two witnesses.

EDMUND B. KIRBY.

Witnesses:
G. M. HEALEY,
LOUELLA F. LITTLE.